United States Patent [19]
White et al.

[11] Patent Number: 5,464,368
[45] Date of Patent: Nov. 7, 1995

[54] PROCESS FOR PREPARING PORK MEAT MORSELS

[76] Inventors: John A. White, 1897 Wachtler, Mendota Heights, Minn. 55118; Omal C. Maitra, 2644 Humboldt Ave., S., Minneapolis, Minn. 55408

[21] Appl. No.: 270,249

[22] Filed: Jul. 5, 1994

[51] Int. Cl.⁶ ................................................. A22C 17/00
[52] U.S. Cl. .................. 452/149; 452/135; 452/155; 452/171; 426/518; 426/524
[58] Field of Search ........................... 452/149, 171, 452/136, 155, 135, 160, 170; 426/518, 524

[56] References Cited

U.S. PATENT DOCUMENTS

| | | | |
|---|---|---|---|
| D. 293,041 | 12/1987 | Gagliardi, Jr. | 452/149 |
| 2,241,648 | 5/1941 | Sprang | 452/149 |
| 3,717,473 | 2/1973 | Bissett | 99/107 |
| 4,628,569 | 12/1986 | Gagliardi, Jr. | 452/149 |
| 4,817,245 | 4/1989 | Melville | 452/149 |
| 5,088,957 | 2/1992 | Gagliardi, Jr. | 452/149 |
| 5,195,924 | 3/1993 | Gagliardi, Jr. | 452/149 |
| 5,250,309 | 10/1993 | Gagliardi, Jr. | 452/149 |
| 5,256,102 | 10/1993 | Heiland et al. | 452/149 |
| 5,266,064 | 11/1993 | Gagliardi, Jr. | 452/149 |
| 5,286,229 | 2/1994 | Gagliardi, Jr. | 452/149 |
| 5,295,896 | 3/1994 | Petersen | 452/171 |
| 5,314,375 | 5/1994 | O'Brien | 452/149 |

*Primary Examiner*—Willis Little
*Attorney, Agent, or Firm*—Kinney & Lange

[57] ABSTRACT

The present invention is a process or method for preparing a pork meat morsel from a pork brisket bone portion having a hard bone, a forward end, and a rearward end. The process involves removing the hard bone from the brisket bone portion. The brisket bone portion is cut laterally with respect to the forward end to create pork meat morsels. The pork meat morsels are inexpensive, easy to prepare and easy to consume. As a result, previously undesirable, lower priced breast bone portions are converted into "finger food" for which there is a higher demand by consumers.

24 Claims, 3 Drawing Sheets

PROCESS FOR PREPARING PORK MEAT MORSELS

BACKGROUND OF THE INVENTION

The present invention relates to a process for preparing a meat product from an animal carcass. In particular, the present invention relates to a process for preparing a pork meat morsel from a pork brisket bone portion.

Pork carcasses are typically butchered into several main cuts or portions including country-style ribs, back ribs and spare ribs. Pork spare ribs are further divided and sold as either St. Louis style spare ribs or breast bone spare ribs. St. Louis style spare ribs generally comprise the upper part of a rib separated from the breast bone or brisket bone by costal cartilage. Because of the generally meatiness and minimal fat associated with the St. Louis style ribs, there is a greater demand for St. Louis style ribs which are consequently more profitable for food providers.

In contrast, the breast bone portion of the spare ribs removed from the St. Louis style spare ribs includes the sternum or hard bone, costal cartilage, soft bones, skirt meat, false lean hanging fat and other tissue. Typically, the breast bone portion is trimmed to remove the skirt meat containing small meaty pieces, otherwise known as rib tips. The remaining breast bone portion contains the hard bone, a large percentage of fat and the soft bones which infiltrate most of the breast bone portion. The soft bones, otherwise known as cartilage bones, are separated from one another by pork meat and tunnel fat. Consequently, trimming away any remaining meat from between the soft bones is difficult. As a result, the remaining breast bone portion is typically viewed as an off-fall product, is not considered desirable by consumers or food producers, and is typically sold at a much lower price.

In recent years, there has been an increase in demand for innovative meat products, particularly meat products which require less time for preparation and which include little or no waste. There has also been an increase in demand for "finger food" such as buffalo wings as appetizers or snack food. As a result, there is a large demand for palatable meat products cut or portioned as morsels which are inexpensive, easy to prepare and easy to consume.

SUMMARY OF THE INVENTION

The present invention is a process for preparing a pork meat morsel from the conventionally butchered pork brisket or breast bone portion which includes a hard bone, a forward end and a rearward end. The process includes removing the hard bone from the brisket bone portion and cutting the brisket bone portion laterally with respect to the forward end to create morsels. The pork meat morsels thus prepared contain pork meat, tunnel fat, and soft bone or cartilage. Because the pork meat contained in each morsel is easily attained, the runnel fat is palatable and edible, similar to bacon fat, and the soft ribs or bone hold and support the meat and tunnel fat together and do not splinter, the pork meat morsels are easily handled, prepared and consumed. As a result, previously undesirable, lower priced breast bone portions are converted into "finger food" for which there is a higher demand by consumers.

DETAILED DESCRIPTION OF THE PREFERRED EMBODIMENTS

Figure 1:
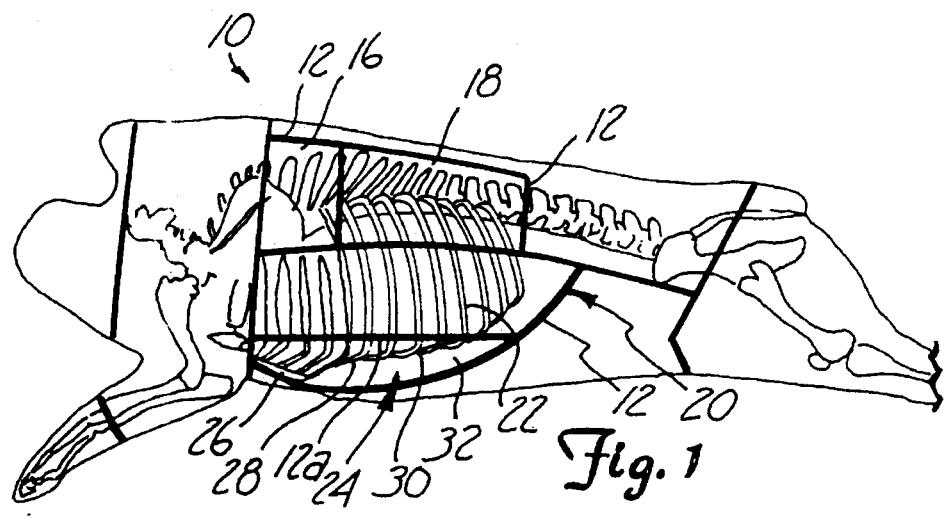
FIG. 1 is a diagrammatical side sectional view of a side of pork with cut lines added to illustrate main portions including a St. Louis style rib portion and a breast bone portion having a hard bone.

FIG. 1 is a diagrammatical side sectional view of the side of pork 10 with cut lines 12 added to illustrate main cuts or portions of side 10 after butchering. Typically, side 10 is butchered about cut lines 12 into main cuts or portions including country-style ribs 16, back ribs 18, and spare ribs 20. Country-style ribs 16 are cut from the blade and the loin to include no less than 3 and no more than 6 ribs. Country-style ribs 16 are identified by Institutional Meat Purchasers Specification (IMPS) No. 423. Back ribs 18, also known as Canadian back ribs and "baby back" ribs, originate from the blade and center section of the loin. Back ribs 18 contain meat between the ribs called finger meat and include at least 8 ribs. Back ribs 18 are identified by IMPS No. 422.

Spare ribs 20 consist of the intact rib section removed from the belly of the pork side and are identified by IMPS No. 416. Pork spare ribs 20 are typically further butchered or cut into St. Louis-style spare ribs 22 and brisket or breast bone spare ribs 24. Spare ribs 20 are separated into St. Louis-style ribs 22 and breast bone spare ribs 24 by cutting about cut line 12a a along costal cartilage connecting the breast bone spare ribs and the St. Louis-style ribs. St. Louis-style ribs 22 are generally denoted by IMPS No. 416A.

Breast bone spare ribs 24 are generally taken from the belly of the hog and are denoted by IMPS No. 416B. Breast bone spare ribs include sternum or hard bone 26, cartilage or soft bones 28, costal cartilage 30, skirt meat 32, false lean hanging fat and other tissue. As discussed above, breast bone portion 24 generally contains a large percentage of fat. In addition, soft ribs or bones 28 pervade most of breast bone spare ribs portion 24. As a result, skirt meat 32 is typically additionally removed and sold as rib tips. Because trimming away any remaining meat between the soft bones is difficult, and because the remaining meat contains a large percentage of fat (mostly tunnel or bacon fat), the remaining breast bone portion 24 is typically sold at a much lower price than either the rib tips or the St. Louis-style ribs.

Figure 2:
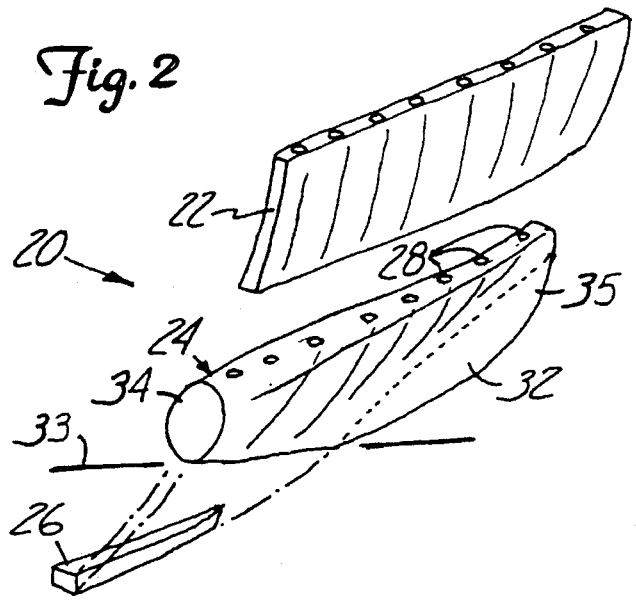
FIG. 2 is a perspective view of the breast bone portion of FIG. 1 removed from the St. Louis style rib portion and further showing the hard bone removed.
Figure 3:
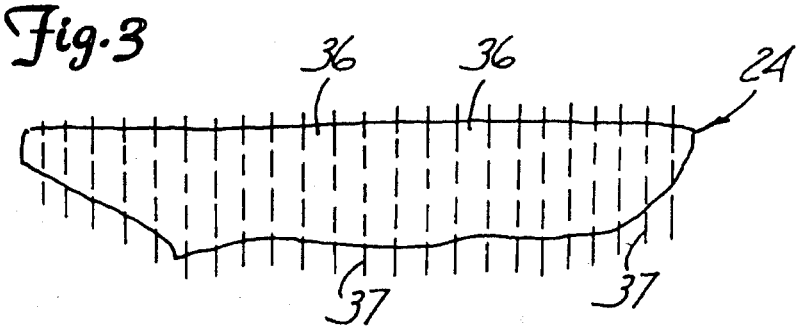
FIG. 3 is a elevational view of the breast bone portion of FIG. 2 showing the hard bone removed from the breast bone portion and showing cut lines laterally across the breast bone portion.

FIGS. 2 and 3 illustrate a method of butchering breast bone portion 24 to form pork meat morsels which are easy to prepare and consume. FIG. 2 is a perspective view of breast bone portion 24 removed from St. Louis-style rib portion 22 along costal cartilage 30 and cut line 12a (shown in FIG. 1). As shown by FIG. 2, hard bone 26 is removed by cutting breast bone portion 24 between hard bone 26 and soft bones 28 along cut line 33. Removing hard bone 26 from breast bone portion 24 makes breast bone portion 24 easier to prepare, handle and consume. Removing hard bone 26 allows breast bone portion 24 to be more easily cut as shown by FIG. 3.

Figure 4:
FIG. 4 is a perspective view of the morsels cut from the breast bone portion shown in FIG. 3.

FIGS. 3 and 4 show breast bone portion 24 with hard bone 26 removed and further cut into morsels 36. Morsels 36 are formed by cutting breast bone portion 24 laterally with respect to a forward end 34 as shown by dashed cut lines 37. Preferably, cuts laterally across breast bone portion 24 are made so that each morsel 36 is from between about ¾ of an inch to about 1 inch thick as measured from the forward end 34 to a rearward end 35 of breast bone portion 24. Because each morsel is cut across the bone so as to have a preferred thickness from between about ¾ of an inch to about 1 inch, each morsel 36 is uniformly heated throughout. In addition, each morsel 36 is in finger food sized portions. For example, morsels 36 cut from towards the forward end 34 of breast bone portion 24 have the preferred thickness and a generally spherical cross-section with a diameter of about 1 inch. Morsels 36 cut from towards the rearward end 35 of breast bone portion 24 have the preferred thickness and a generally oblong cross-section having a maximum diameter of about 1½ inches and a minimum diameter of about ½ inch. As can be appreciated, the size and exact shape of the cross-section of each morsel 36 may vary greatly depending upon the size of the animal from which the side of pork is taken and upon the exact cutting points at which breast bone portion 24 is separated from rib portion 22. Upon being cooked, morsels 36 generally consist of pork meat, tunnel fat, and soft bones 28. Because tunnel fat, like the fat in bacon, becomes brown and crispy, and is generally palatable, and because morsels 36 are in easily handled finger food sized portions, the pork meat as well as the tunnel fat may be easily accessed and eaten. This characteristic enables morsels 36 to be easily consumed either alone or with various sauces. In addition, because soft bones 28 are left as part of morsels 36, soft bones 28 hold and support the surrounding tunnel fat and pork meat while providing a "handle" by which morsels 36 may be consumed as "finger food." Because soft bones 28 consist largely of cartilage, soft bones 28 do not splinter as the tunnel fat and pork meat are eaten. Thus, each morsel is easily handled, prepared and consumed as a "finger food", resulting in an increased demand and a higher price for morsels 36 prepared from the previously lower valued breast bone portion of pork side 10.

Figure 5:
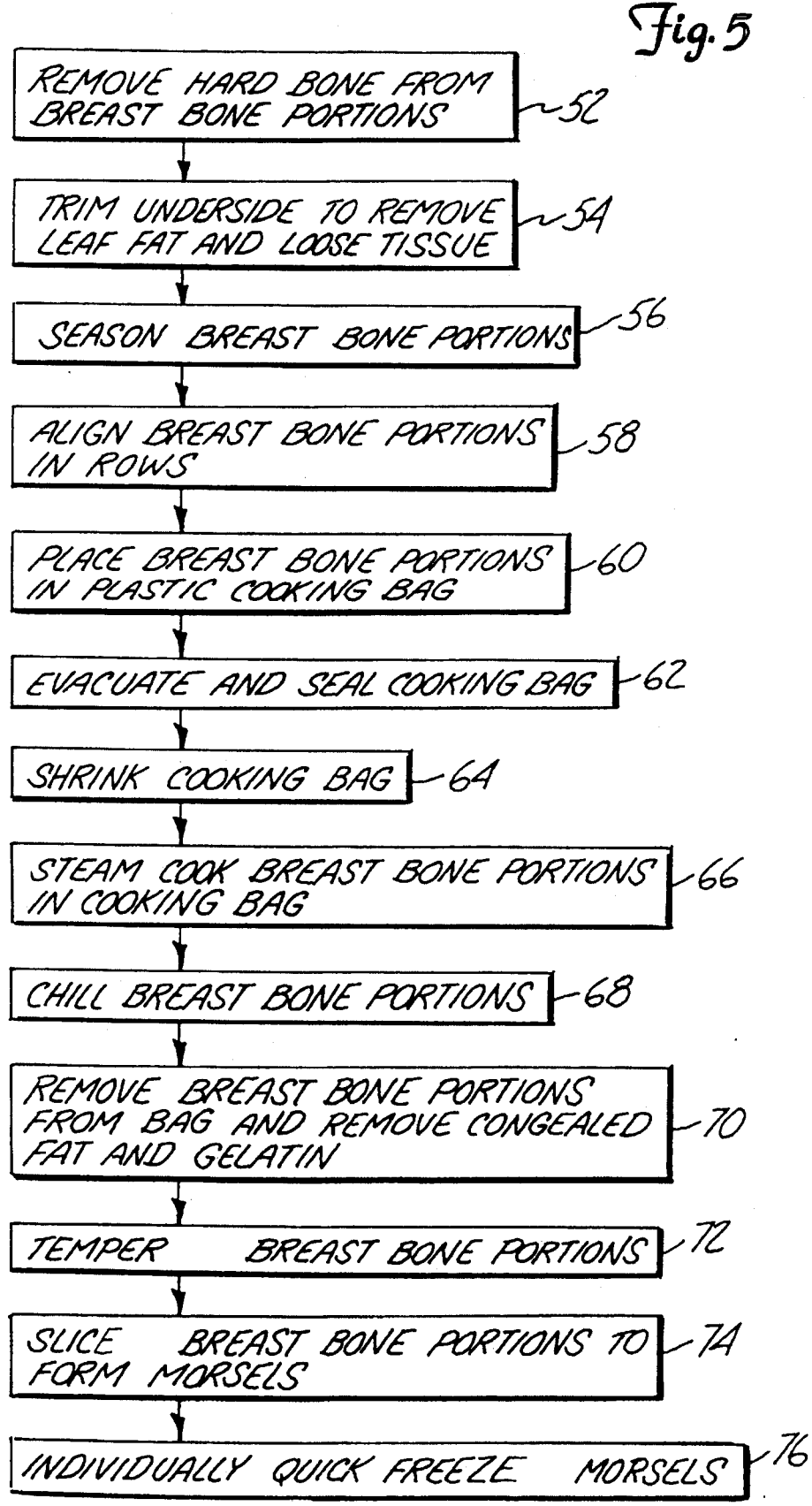
FIG. 5 is a block diagram illustrating a process for preparing pork meat morsels from brisket bone portions.

FIG. 5 is a block diagram illustrating the process for preparing pork meat morsels from brisket bone portions. As discussed above, brisket bone portions, otherwise known as breast bone spareribs, are generally taken from the belly of the hog and include the hard bone, soft bone (cartilage bone), skirt meat and pork meat interlaced with tunnel tat between the soft bones. As shown by block 52, the conventionally butchered brisket bone portions are cut adjacent to the hard bone of each brisket bone portion to remove the hard bone. Removing the hard bone from the brisket bone portions makes the brisket bone portions easier to handle, prepare and eventually consume.

As illustrated in blocks 54 and 56, the brisket bone portions are trimmed to remove all extraneous leaf fat or lard and any loose hanging muscle tissue. The remaining brisket bone portions (including the soft bone or cartilage bone, the skirt meat and the pork meat interlaced with tunnel fat between the soft bones) are seasoned either through an injector or a vacuum tumbler, as is conventionally known. Seasoning is preferably added at a maximum level of 10% of the raw, unprocessed weight of the remaining brisket bone portions. Preferably, seasoning is added at a level of about 3% of the raw, unprocessed weight of the brisket bone portions. The remaining brisket bone portions are massaged in a vacuum tumbler until the portions are completely coated and until all of the seasoning is absorbed by the brisket bone portions. As can be appreciated, time for seasoning the brisket bone portions varies depending upon the quality of the pork, type of tumbler being used, and the desired end-flavor. Furthermore, as can be appreciated, any of the steps illustrated by blocks 52–56 may alternatively be performed in different order.

The seasoned pork brisket bone portions are then aligned in rows and placed end-to-end in an impermeable plastic cooking bag which is evacuated or vacuumed, sealed and shrunk. Preferably, 7–8 seasoned brisket bone portions are placed in each individual bag. The brisket bone portions are positioned so as to minimize any overlapping of the individual brisket bone portions and are kept as straight as possible to avoid curling during cooking. As a further step to avoid curling, the bag is minimally shrunk around the brisket bone portions. By preventing curling, the brisket bone portions are maintained at a low profile in the bag which facilitates a quick and even cook. These steps are illustrated by blocks 58–64.

The bagged brisket bone portions are preferably placed on cook racks in steam cookers or ovens and cooked for approximately 8–9 hours, raising the oven temperature gradually until an internal temperature (in the brisket bone portions) of 175° F. is attained. Preferably, the bagged pork brisket bone portions are cooked at 140° F. for two hours, 150° F. for two hours, 160° F. for two hours, 170° F. for two hours and 180° F. for two hours or until an internal temperature of 175° F. is attained. The above cooking procedure renders fat to achieve a precise shrink of the brisket bone portions and to guarantee a precise level of tenderness. At 175° F., the only fat remaining as part of the brisket bone portions is tunnel fat, otherwise known at bacon fat. Because the brisket bone portions are pre-cooked, the end products or pork meat morsels may be easily and quickly prepared at a later time by merely heating up the pork meat morsels at a temperature of preferably about 450° to about 550° to brown and crisp the bacon fat. The cooking process is illustrated by block 66.

Upon attaining an internal temperature of 175° F., the bagged brisket bone portions are immediately chilled in a blast chill or brine chill to stop the cooking process. Preferably, the brisket bone portions are chilled to reduce the internal temperature to below at least 40° F. to meet U.S.D.A. chilling guidelines. This chilling step is illustrated by block 68.

Once the bagged brisket bone portions have been chilled, the brisket bone portions are removed from the cooking bag. All congealed fat and gelatin which is rendered from the brisket bone portions during cooking is removed or drained from the brisket bone portions. This is illustrated by block 70.

As illustrated by block 72 and 74, the brisket bone portions are then tempered or further chilled to an internal temperature of about 28° F. to facilitate slicing or portioning through a high impact slicer. The brisket bone portions are cut laterally with respect to the forward end of each brisket bone portion to create easily handled and consumed pork meat morsels. Preferably, the brisket bone portions are cut into pieces having a width or thickness from between about ¾ of an inch to about 1 inch. Tail ends, located towards the forward end and the rearward end of each brisket bone portion, preferably have a maximum width of about 1½ inches. Because each piece preferably has a width from between about ¾ of an inch to about 1 inch, each morsel may be more uniformly and completely reheated during preparation. Moreover, each morsel is more easily handled and consumed.

The sliced pork meat morsels are preferably passed through a cryogenic freeze tunnel which blasts frozen nitrogen gas to individually quick freeze each pork meat morsel. The frozen pork meat morsels are then preferably bagged and flushed with 3% nitrogen and sealed for storage and transportation in freezers. This final freezing step is illustrated by block 76.

Figure 6:
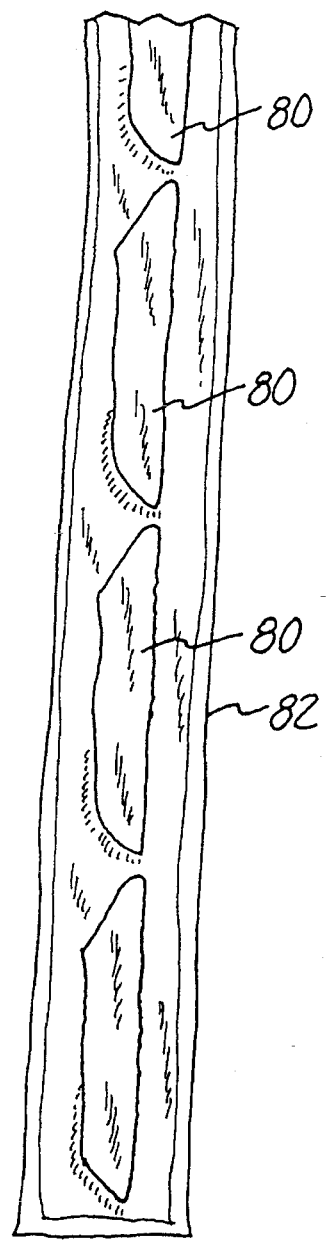
FIG. 6 is an elevational view of pork breast bone portions trimmed to remove the hard bone and placed in a cooking bag.

FIG. 6 shows the preferred method of cooking the trimmed and seasoned brisket bone portions as diagrammed by blocks 58–66 in FIG. 5. As best shown by FIG. 6, the trimmed and seasoned brisket bone portions 80 are laid flat, end-to-end in an elongated impermeable plastic cooking bag 82. Preferably, approximately 7–8 brisket bone portions are placed within each individual bag 82. Brisket bone portions 80 are placed end-to-end and are positioned adjacent one another so as to minimize overlapping to maintain a low profile in bag 82. By maintaining a low profile, each brisket bone portion 82 is quickly and evenly cooked. Once brisket bone portions 80 are positioned within bag 82, bag 82 is evacuated or vacuumed, sealed and shrunk. Bag 82 is preferably shrunk to close tolerance with brisket bone portions 80 so as to prevent curling of brisket bone portions 80 during cooking. Brisket bone portions 80 in cooking bags 82 are then placed on steam racks for steam cooking as described and illustrated in conjunction with block 66 in FIG. 5.

In conclusion, the above described process converts generally lower priced conventionally butchered breast bone portions into higher priced palatable pork meat morsels which are more easily handled, prepared and consumed. Because the morsels are cut into finger food sized portions, preferably having a thickness from between about ¾ of an inch to about 1 inch, the pork morsels are more uniformly heated throughout, are more easily prepared and are more easily handled and consumed. Because the morsels are formed by cutting laterally with respect to the forward end of the breast bone portion, the soft bones hold and support the meat and tunnel fat together and do not splinter, also enabling morsels to be more easily consumed. The present invention provides an innovative meat product which is inexpensive, easy to prepare and easy to consume.

Although the present invention has been described with reference to preferred embodiments, workers skilled in the art will recognize that changes may be made in form and detail without departing from the spirit and scope of the invention.

What is claimed is:

1. A process for preparing a pork meat morsel from a pork brisket bone portion having a hard bone, a forward end, and a rearward end, the process comprising:

removing the hard bone from the brisket bone portion;

cutting the brisket bone portion laterally with respect to the forward end to create morsels; and seasoning the brisket bone portion after the hard bone is removed, wherein the seasoning added is at a maximum level of about 10% of a raw unprocessed weight of the brisket bone portion.

2. The process of claim 1 wherein the brisket bone portion is cut laterally with respect to the forward end to create morsels having a width of between about ¾ of an inch to about 1 inch.

3. The process of claim 1 including cooking the brisket bone portion until the brisket bone portion has an internal temperature of about 175° F.

4. The process of claim 3 including chilling the cooked brisket bone portion until the brisket bone has an internal temperature of below about 40° F. to stop the cooking process.

5. The process of claim 3 wherein the brisket bone portion is cooked using steam.

6. The process of claim 1 including quick freezing the morsels individually.

7. The process of claim 6 wherein quick freezing is performed in a cryogenic freeze tunnel.

8. Pork meat morsels formed from a side of pork, by the method comprising:

cutting along the cartilage to separate a breast bone portion from the ribs, the breast bone portion having a hard bone, a forward end and a rearward end;

removing the hard bone from the breast bone portion;

cutting the breast bone portion laterally with respect to the forward end to create morsels.

9. The method of claim 8 wherein the breast bone portion is cut laterally with respect to the forward end to create morsels having a width of between about ¾ of an inch to about 1 inch.

10. The method of claim 8 including:

seasoning the breast bone portion after the breast bone portion has been separated from the ribs.

11. The method of claim 8 including:

cooking the breast bone portion after the hard bone has been removed until the breast bone has an internal temperature of about 175° F.

12. The method of claim 11 including:

chilling the cooked breast bone portion until the breast bone portion has an internal temperature of below about 40° F. to stop the cooking process.

13. The process of claim 8 including:

quick freezing the morsels individually in a cryogenic freeze tunnel.

14. A process for preparing pork meat morsels from brisket bones portions, each brisket bone portion having a hard bone, a forward end, and a rearward end, the process comprising:

cutting the brisket bone portions to remove the hard bones from each brisket bone portion;

cooking the brisket bone portions until the brisket bone portions have an internal temperature of about 175° F.;

chilling the cooked brisket bone portions until the brisket bone portions have an internal temperature of below about 40° F; and slicing the brisket bone portions laterally with respect to the forward end to create meat morsels, each meat morsel having a width of between about ¾ of an inch to about 1 inch.

15. The process of claim 14 wherein cooking the brisket bones includes:

aligning the brisket bone portions in rows;

placing the aligned brisket bone portions in an impermeable plastic cooking bag;

evacuating and sealing the bag; and applying steam to the bag of brisket bone portions from between about 8 hours to about 9 hours until each brisket bone portion has an internal temperature of about 175° F.

16. The process of claim 15 including:

shrinking the vacuumed and sealed cooking bag to prevent curling of the brisket bone portions during cooking.

17. The process of claim 15 including:

maintaining the brisket bone portions at a low profile in the cooking bag to facilitate a quick and even cook.

18. The process of claim 15 including:

removing the cooked and chilled brisket bone portions from the cooking bag and draining rendered fat from the brisket bone portions.

19. The process of claim 14 including:

chilling the chilled brisket bone portions to an internal temperature of about 28° F. to facilitate slicing.

20. The process of claim 14 including:

seasoning the brisket bone portions after the hard bones have been removed.

21. The process of claim 14 including:

individually freezing the pork meat morsels.

22. The process of claim 21 wherein freezing the meat morsels includes:

passing the meat morsels through a cryogenic freeze tunnel to individually quick freeze the morsels.

23. A process for preparing a pork meat morsel from a pork brisket bone portion having a hard bone, a forward end, and a rearward end, the process comprising:

removing the hard bone from the brisket bone portion;

cutting the brisket bone portion laterally with respect to the forward end to create morsels; and quick freezing the morsels individually.

24. The method of claim 23 wherein quick freezing is performed in a cryogenic freeze tunnel.

* * * * *

UNITED STATES PATENT AND TRADEMARK OFFICE
CERTIFICATE OF CORRECTION

PATENT NO. : 5,464,368
DATED : November 7, 1995
INVENTOR(S) : JOHN A. WHITE, OMAL C. MAITRA It is certified that error appears in the above-indentified patent and that said Letters Patent is hereby corrected as shown below:

Col. 1, line 55, delete "runnel" insert --tunnel--

Signed and Sealed this

Twentieth Day of February, 1996

Attest:

BRUCE LEHMAN

Attesting Officer

Commissioner of Patents and Trademarks